United States Patent
Dimpelfeld et al.

(10) Patent No.: US 10,337,379 B2
(45) Date of Patent: Jul. 2, 2019

(54) MIXER ASSEMBLY FOR A VEHICLE EXHAUST SYSTEM

(71) Applicant: Faurecia Emissions Control Technologies, USA, LLC, Columbus, IN (US)

(72) Inventors: Philip M. Dimpelfeld, Columbus, IN (US); Eduardo Alano, Columbus, IN (US)

(73) Assignee: FAURECIA EMISSIONS CONTROL TECHNOLOGIES, USA, LLC, Columbus, IN (US)

( * ) Notice: Subject to any disclaimer, the term of this patent is extended or adjusted under 35 U.S.C. 154(b) by 56 days.

(21) Appl. No.: 15/030,388

(22) PCT Filed: Feb. 7, 2014

(86) PCT No.: PCT/US2014/015241
§ 371 (c)(1),
(2) Date: Apr. 19, 2016

(87) PCT Pub. No.: WO2015/119617
PCT Pub. Date: Aug. 13, 2015

(65) Prior Publication Data
US 2016/0251990 A1    Sep. 1, 2016

(51) Int. Cl.
*F01N 3/28*    (2006.01)
*F01N 3/20*    (2006.01)

(52) U.S. Cl.
CPC ......... *F01N 3/2892* (2013.01); *F01N 3/2066* (2013.01); *F01N 2610/02* (2013.01); *Y02A 50/2325* (2018.01); *Y02T 10/24* (2013.01)

(58) Field of Classification Search
CPC .. F01N 2610/02; F01N 3/2066; F01N 3/2892; Y02T 10/24

(Continued)

(56) References Cited

U.S. PATENT DOCUMENTS 7,730,721 B2 * 6/2010 Kimura ................ F01N 3/2066
60/286
7,895,828 B2 * 3/2011 Satou ...................... B01D 53/90
60/286

(Continued)

FOREIGN PATENT DOCUMENTS

CN    101732992 A    6/2010
CN    202012386    10/2011

(Continued)

OTHER PUBLICATIONS

International Preliminary Report on Patentability for International Application No. PCT/US2014/015241 dated Aug. 18, 2016.

(Continued)

*Primary Examiner* — Phutthiwat Wongwian
*Assistant Examiner* — Diem T Tran
(74) *Attorney, Agent, or Firm* — Carlson, Gaskey & Olds, P.C.

(57) ABSTRACT

A mixer assembly includes an outer housing having an inlet area that receives exhaust gas from an upstream exhaust component and an outlet area that directs exhaust gas to a downstream exhaust component. The outer housing includes an outer wall extending outwardly from the base wall about a periphery of the base wall and a deflector wall that directs exhaust gas from the inlet area to the outlet area. The deflector wall has a portion spaced from the outer wall to define a flow guide path that first directs exhaust gas flow from the inlet area in a first direction against a first portion of the outer wall and then directs exhaust gas flow in a second direction against a second portion of the outer wall that is transverse to the first portion.

24 Claims, 5 Drawing Sheets

(58) Field of Classification Search
USPC .......................................... 60/286, 303, 324
See application file for complete search history.

(56) References Cited

U.S. PATENT DOCUMENTS

| | | | |
|---|---|---|---|
| 8,425,851 | B2 | 4/2013 | Kimura |
| 9,266,075 | B2 | 2/2016 | Chapman |
| 2010/0257849 | A1 | 10/2010 | Kowada |
| 2010/0319329 | A1 | 12/2010 | Khadiya |
| 2011/0041488 | A1 | 2/2011 | Bisaiji et al. |
| 2011/0308234 | A1 | 12/2011 | DeRudder et al. |
| 2013/0216442 | A1 | 8/2013 | Brunel et al. |
| 2013/0239546 | A1 | 9/2013 | Levin et al. |

FOREIGN PATENT DOCUMENTS

| | | |
|---|---|---|
| CN | 202360191 | 8/2012 |
| CN | 202467984 | 10/2012 |
| DE | 102006049875 A1 | 4/2008 |
| FR | 2873157 | 1/2006 |
| JP | 2007040149 A | 2/2007 |
| WO | 2009024815 | 2/2009 |
| WO | 2015012829 | 1/2015 |
| WO | 2015105500 | 7/2015 |

OTHER PUBLICATIONS

International Search Report from corresponding PCT/US14/15241.
Supplementary Partial European Search Report for European Application No. 14881757.0 dated Feb. 16, 2018.

\* cited by examiner

MIXER ASSEMBLY FOR A VEHICLE EXHAUST SYSTEM

BACKGROUND OF THE INVENTION

An exhaust system conducts hot exhaust gases generated by an engine through various exhaust components to reduce emissions and control noise. The exhaust system includes an injection system that injects a reducing agent, such as a solution of urea and water for example, upstream of a selective catalytic reduction (SCR) catalyst. A mixer is positioned upstream of the SCR catalyst and mixes engine exhaust gases and products of urea transformation.

The doser typically sprays the urea into the exhaust stream. In one known configuration, the doser is mounted to an outer peripheral surface of the mixer and is configured to direct the spray radially inwardly toward a center of the mixer. This spray configuration can result in increased urea deposit formation.

SUMMARY OF THE INVENTION

In one exemplary embodiment, a vehicle exhaust system has a mixer assembly that includes an outer housing having an inlet area that receives exhaust gas from an upstream exhaust component and an outlet area that directs exhaust gas to a downstream exhaust component. The outer housing includes an outer wall and a deflector wall that directs exhaust gas from the inlet area to the outlet area. The deflector wall has a portion spaced from the outer wall to define a flow guide path that first directs exhaust gas flow from the inlet area in a first direction against a first portion of the outer wall and then directs exhaust gas flow in a second direction against a second portion of the outer wall that is transverse to the first portion.

In a further embodiment of the above, the portion of the deflector that is spaced from the outer wall comprises at least a first wall portion that extends in the first direction and transitions to a second wall portion that extends in the second direction. The deflector further includes a third wall portion that extends from the first wall portion in the second direction at an end opposite of the second wall portion.

In a further embodiment of any of the above, a distal end of the third wall portion extends to contact the outer wall.

In a further embodiment of any of the above, the outer housing includes a doser opening configured to receive an injector, with the doser opening defining a mounting angle to direct injected fluid at an oblique angle relative to exhaust gas flow.

In a further embodiment of any of the above, the outer housing is defined by an overall length and an overall width that is less than the overall length, and wherein a path length of the flow guide path is greater than the overall width of the housing.

In a further embodiment of any of the above, the deflector and outer wall cooperate to direct the exhaust gas flow in a third direction that is transverse to the second direction to create a swirling effect.

In another exemplary embodiment, a mixer assembly for a vehicle exhaust component includes an outer housing having an inlet area that receives exhaust gas from an upstream exhaust component and an outlet area that directs exhaust gas to a downstream exhaust component. The outer housing includes an outer wall that defines first and second sides that face each other and which are connected to each other by third and fourth sides that face each other. The first and second sides define an overall housing height and the third and fourth sides define an overall housing width that is less than the overall housing height. A deflector wall direct exhausts gas from the inlet area to the outlet area. The deflector wall has a portion spaced from the outer wall to define a flow guide path to the outlet area. The flow guide path has a path length that is greater than the overall housing width.

In a further embodiment of any of the above, the outer housing includes a doser opening configured to receive a doser that injects a fluid into the flow guide path, and wherein a mixing length of the flow guide path is defined as a portion of the flow guide path that extends from the doser opening to the outlet area, and wherein the mixing length is greater than the overall housing width.

In a further embodiment of any of the above, the flow guide path guides exhaust gas flow from the inlet area in a first direction along one of the first and second sides of the outer wall and then directs exhaust gas flow in a second direction along one of the third and fourth sides of the outer wall.

In a further embodiment of any of the above, the outer housing includes a connection interface configured for attachment to an exhaust component housing, the outer housing having a base wall with the outer wall extending about a periphery of the base wall, and wherein the connection interface is positioned opposite of the base wall.

These and other features of this application will be best understood from the following specification and drawings, the following of which is a brief description.

DETAILED DESCRIPTION

Figure 1:
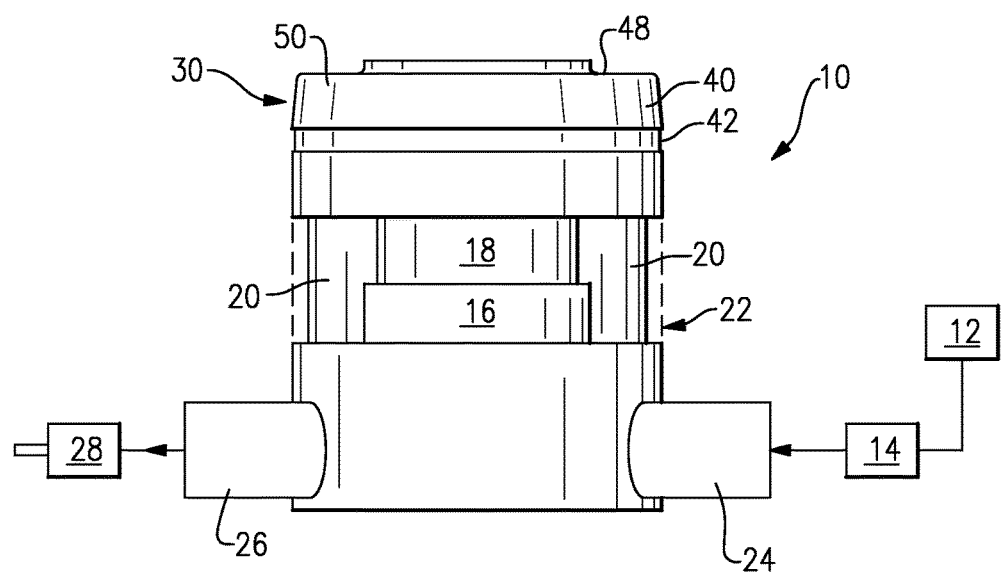
FIG. 1 schematically illustrates one example of an exhaust system component with a mixer assembly according to the subject invention.
Figure 3:
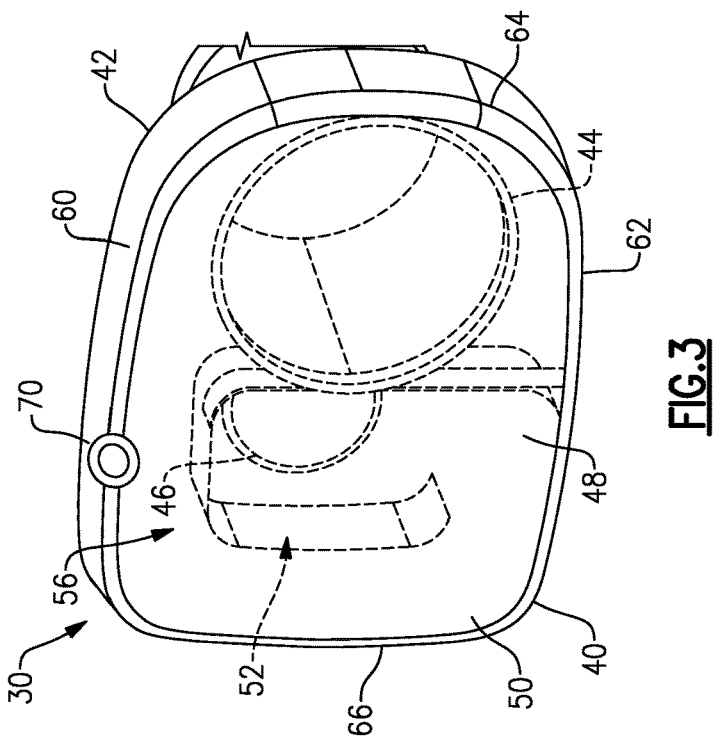
FIG. 3 is a perspective end view of the mixer assembly of FIG. 2.

FIG. 1 shows a vehicle exhaust system 10 that conducts hot exhaust gases generated by an engine 12 through various upstream exhaust components 14 to reduce emission and control noise as known. The various upstream exhaust components 14 can include one or more of the following: pipes, filters, valves, catalysts, mufflers etc.

In one example, configuration, the upstream exhaust components 14 direct exhaust gases into a diesel oxidation catalyst (DOC) 16 and then into a diesel particulate filter (DPF) 18 that is used to remove contaminants from the exhaust gas as known. Downstream of the DOC 16 and DPF 18 are one or more selective catalytic reduction (SCR) catalysts 20. The DOC 16, DPF 18, and SCR catalyst(s) 20 are enclosed within a common housing 22. The housing 22 has an inlet 24 that receives exhausts exhaust from the engine 12 and any upstream exhaust components 14, and has an outlet 26 that directs exhaust gases to downstream exhaust components 28. The various downstream exhaust components 28 can include one or more of the following: pipes, filters, valves, catalysts, mufflers etc. These upstream 14 and downstream 28 components can be mounted in various different configurations and combinations dependent upon vehicle application and available packaging space.

A mixer 30 is positioned downstream of the DOC 16 and DPF 18 and upstream of the SCR catalyst 20. The mixer 30 is used to generate a swirling or rotary motion of the exhaust gas. The configuration of the mixer will be discussed in greater detail below.

An injection system 32 (FIG. 2) is used to inject a reducing agent, such as a solution of urea and water for example, into the exhaust gas stream upstream from the SCR catalyst 20 such that the mixer 30 can mix the urea and exhaust gas thoroughly together. The injection system 32 includes a fluid supply 34, a doser 36, and a controller 38 that controls injection of the urea as known.

One example of the mixer 30 is shown in greater detail in FIGS. 2-5. The mixer 30 comprises an outer housing 40 having a connection interface 42 configured for attachment to the housing 22. The outer housing 40 can be welded, brazed, fastened, etc. to the housing 22 at the connection interface 42. The outer housing 40 has an inlet area 44 that receives exhaust gas exiting the DPF 18 and an outlet area 46 that directs exhaust gas to the SCR catalyst(s) 20.

The outer housing includes a base wall 48 with an outer wall 50 extending outwardly from the base wall 48 about a periphery of the base wall 48. A deflector wall 52 directs exhaust gas from the inlet area 44 to the outlet area 46. The deflector wall 52 has a wall portion that is spaced inwardly from the outer wall 50 to define a flow guide path 56 that first directs exhaust gas flow from the inlet area 44 in a first direction against a first portion of the outer wall 50 and then directs exhaust gas flow in a second direction against a second portion of the outer wall 50 that is transverse to the first portion. The deflector wall 52 and outer wall 50 then cooperate to direct exhaust gas flow in a third direction that is transverse to the second direction and opposite of the first direction. The deflector wall 52 then directs exhaust gas in a fourth direction that is transverse to the third direction. This configuration creates a swirling effect in the exhaust gas in a generally common planar area defined by the deflector wall 52 (and including the guide path 56 that comprises the first F1, second F2, and third F3 flow directions) prior to exiting the housing 40. The exhaust gas mixture then exits the housing 40 in a direction that is generally perpendicular to the common planar area. The deflector wall 52 facilitates mixing of the injected reducing agent and exhaust gas such that a mixture of swirling engine exhaust gas and products transformed from urea are directed into the SCR catalyst(s) 20.

Figure 4:
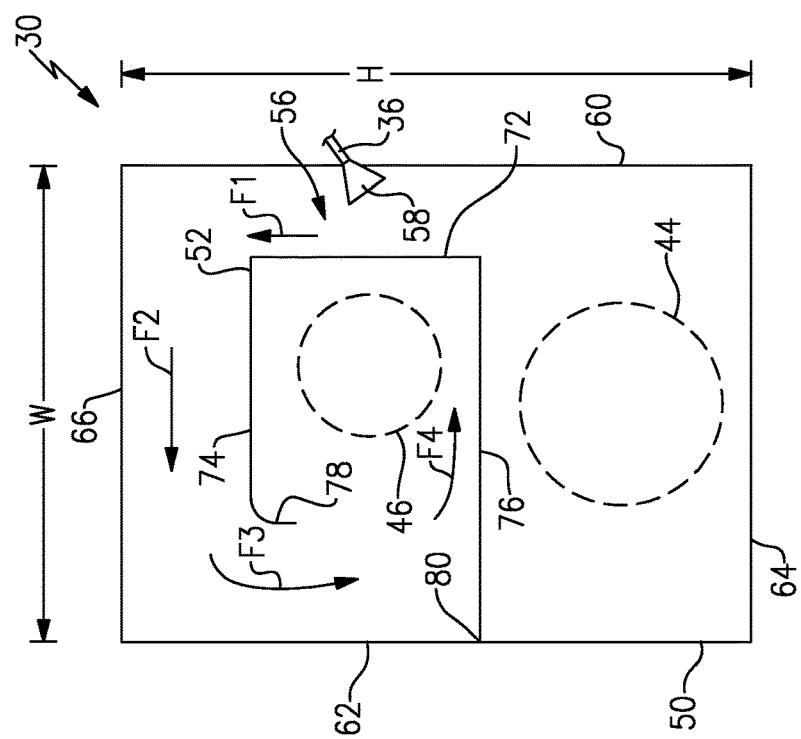
FIG. 4 is a schematic end view of the mixer assembly of FIG. 3.
Figure 5:
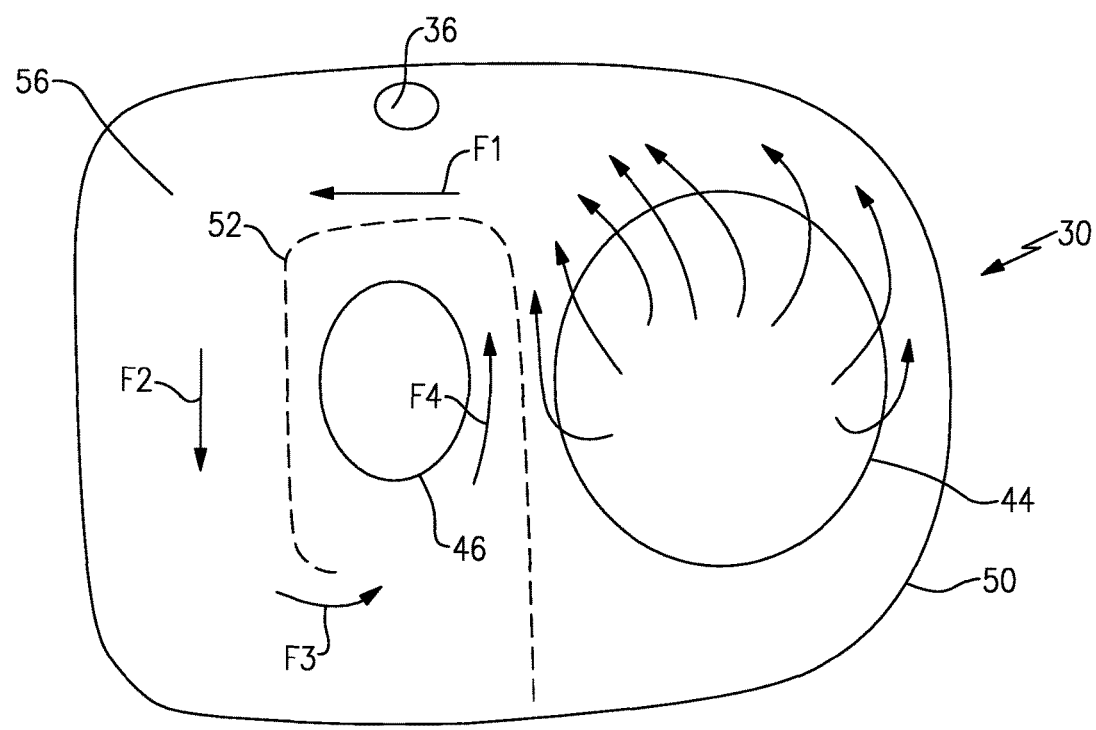
FIG. 5 is a view similar to FIG. 4 but showing an exhaust flow mixing pattern.

In one example shown in FIG. 4, the outer wall 50 includes at least first 60 and second 62 side wall portions that face each other and which are connected to each other by third 64 and fourth 66 side wall portions that face each other. The first 60 and second 62 side wall portions define an overall housing height H and the third 64 and fourth 66 side wall portions define an overall housing width W. In one example, the flow guide path 56 has a path length that is greater than the overall housing width W.

Figure 2:
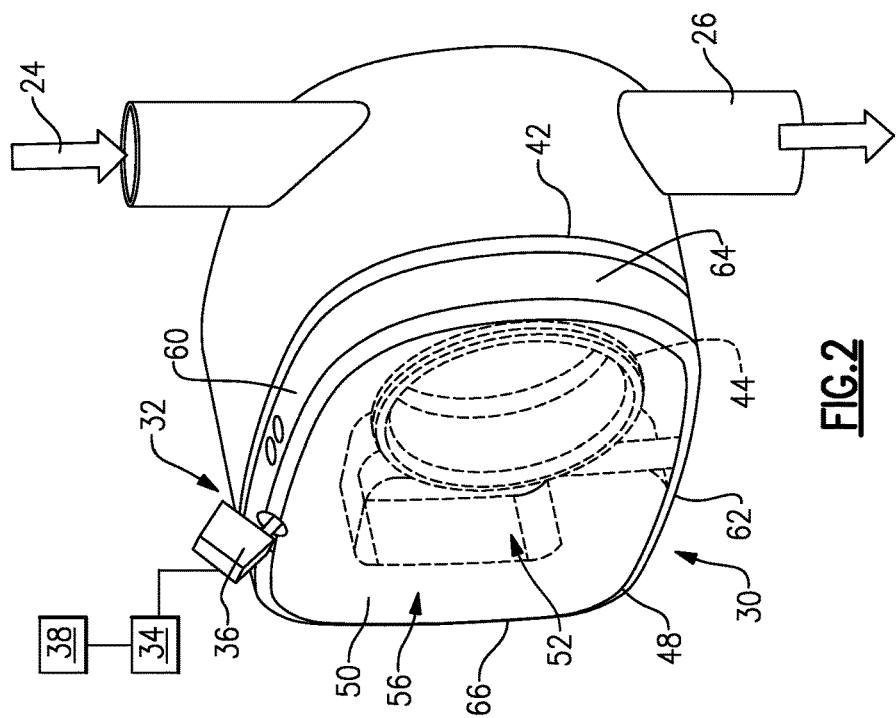
FIG. 2 is a perspective view of the exhaust component of FIG. 1.

The doser 36 can be mounted to the end wall or base wall 48 or the outer wall 50 as needed. In one example, the outer peripheral surface of the outer wall 50 includes a doser mount area with an opening 70 (FIG. 3) to receive the doser 36 (FIG. 2). In one example, the opening 70 for the doser 36 is positioned just downstream of the inlet area 44 and near the beginning of the flow guide path 56 such that urea is sprayed into the swirling gas flow between the deflector wall 52 and the outer wall 50 at a location that is well upstream of the outlet area 46. The doser 36 could also be located at other positions along the guide path 56 depending upon packaging constraints. A cone 58 (FIG. 4) may be included inside the mixer to reduce urea deposit formation at the injection location. In one example, the doser 36 is positioned at a mounting angle to direct injected fluid at an oblique angle relative to exhaust gas flow.

A mixing length is defined as the length of the guide path 56 that extends from the doser mount area at the opening 70 to the outlet area 46. In one example, the deflector wall 52 is configured such that the mixing length is greater than the overall housing width W.

In one example configuration, the outer housing 40 has an approximate height of 680 mm and an approximate width of 530 mm. The mixing length is approximately 620 mm.

In the example shown in FIGS. 2-5, the deflector wall 52 has at least a first wall portion 72 that is spaced from the first side wall portion 60 and a second wall portion 74 that is spaced from the fourth side wall portion 66. The first wall portion 72 defines a first flow direction F1 for the flow guide path 56 and the second wall portion 74 defines a second flow direction F2 for the flow guide path 56 that is transverse to the first flow direction F1. A third wall portion 76 extends from the first wall portion 72 and faces the second wall portion 74 to form a U-shape. The exhaust gas flows in the first flow direction F1, turns the corner at the intersection of walls 60, 66 to flow in the second flow direction F2 that is transverse to the first flow direction F1, turns the corner at the intersection of walls 62, 66 to flow in a third flow direction F3 that is transverse to the second flow direction F2, and then is directed by the third wall portion 76 to flow in a fourth flow direction F4 that is transverse to the third flow direction F3. This configuration creates a swirling effect in the exhaust gas to thoroughly mix the injected fluid with the exhaust gas.

The outlet area 46 to the SCR catalyst(s) 20 is located within an internal area defined by the deflector wall 52. The SCR catalyst(s) 20 are positioned to extend in a direction that extends into the page when viewed in FIG. 4. The deflector wall 52 is configured to create a swirling effect of mixed fluid and exhaust gas that exits the housing 40 in a direction that is non-parallel to the direction in which the SCR catalyst(s) 20 extends. In one example, the mixed fluid and exhaust gas is mixed within the common planar area in the housing 40 in a plane that is perpendicular to the direction in which the SCR catalyst(s) 20 extends. This allows the mixture to be more evenly distributed across the end face inlets of the SCR catalyst(s) 20. The exhaust gas mixture then exits the housing 40 in a direction that is generally perpendicular to the common planar area.

A distal end 78 of the second wall portion 74 may include an inwardly curved portion to further facilitate swirling flow as the mixture exits the outlet area 46. Further, transition areas between the first and second wall portions 72, 74 and between the third and first wall portions 76, 72 can be curved or rounded to further facilitate initiation of swirling flow. A distal end 80 of the third wall portion 76 is preferably extended to contact the outer wall 50. This allows all exhaust gas entering the housing 40 via the inlet area 44 to be directed to the beginning of the flow guide path 56 (see FIG. 5).

Figure 7:
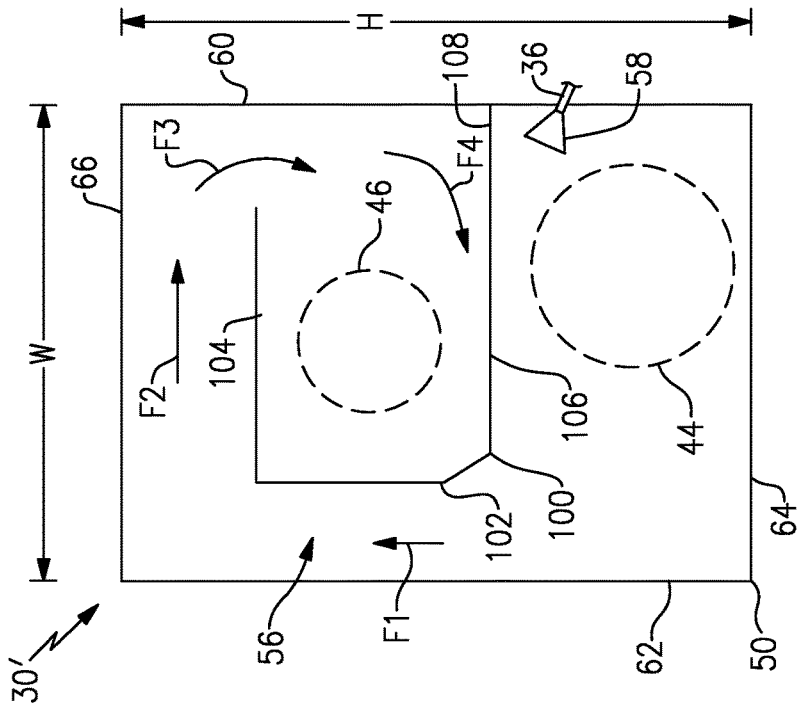
FIG. 7 is a schematic end view of the mixer assembly of FIG. 6.
Figure 6:
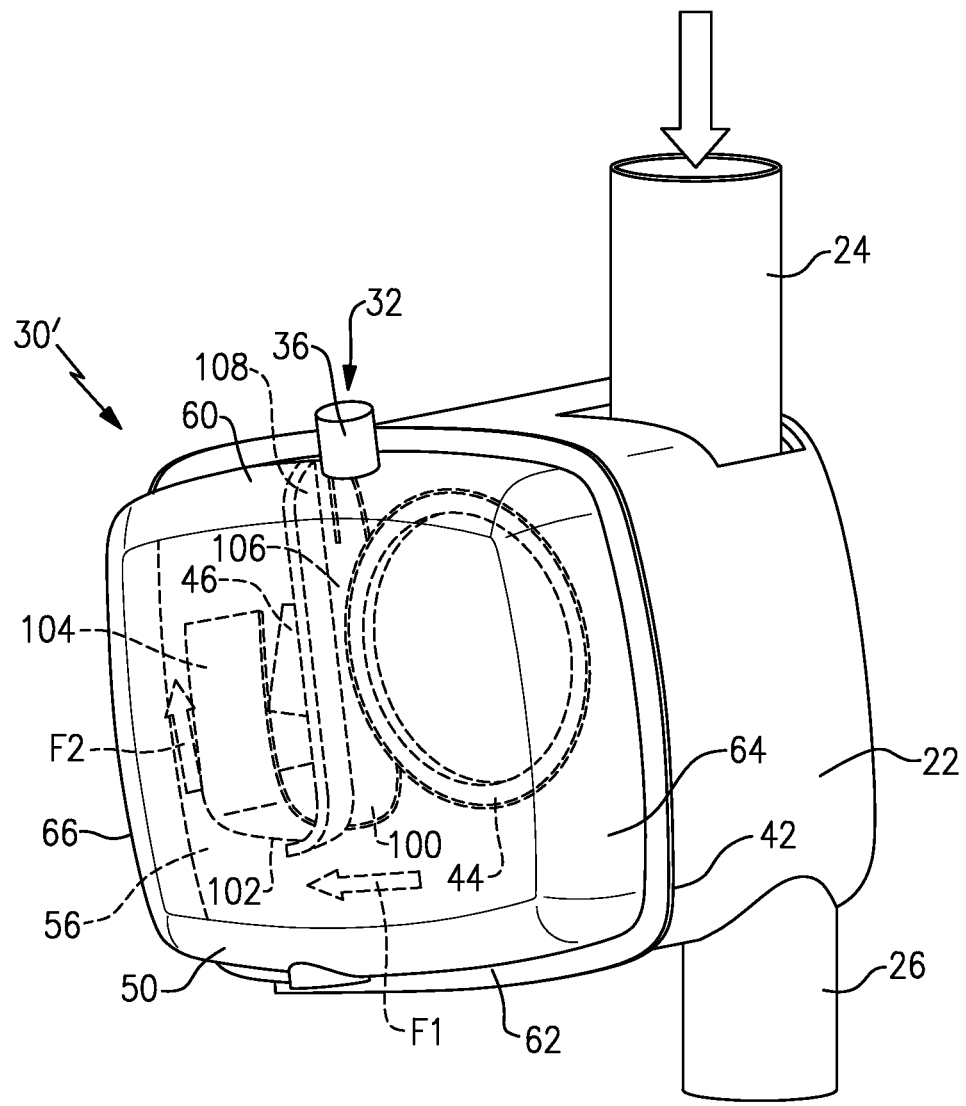
FIG. 6 is a perspective view of another example of a mixer assembly.

FIGS. 6-7 show another example embodiment of a mixer assembly 30' that is similar to FIGS. 2-5 but which includes a different deflector wall configuration. In this example, a deflector wall 100 includes a first wall portion 102 that is spaced from the second side wall portion 62 and a second wall portion 104 that is spaced from the fourth side wall portion 66. The first wall portion 102 defines a first flow direction F1 for the flow guide path 56 and the second wall portion 104 defines a second flow direction F2 for the flow guide path 56 that is transverse to the first flow direction F1. A third wall portion 106 extends from the first wall portion 102 and faces the second wall portion 104 to form a U-shape. A distal end 108 of the third wall portion 106 is extended to contact the outer wall 50 to allow all exhaust gas entering the mixer via the inlet area 44 to be directed to the beginning of the flow guide path 56 (see FIG. 7).

Exhaust gas flows along the first side wall 60 in a third flow direction F3 that is transverse to the second flow direction F2. The exhaust gas is then directed by the third wall portion 106 in a fourth flow direction F4 that is transverse to the third flow direction F3 to provide a thorough mixture of injected fluid and exhaust gas.

In either configuration, the deflector wall 52, 100 may include one or more holes positioned at desired locations to reduce back pressure and/or to improve flow.

The subject invention provides a mixing duct configuration with a single doser that thoroughly mixes the reducing agent and exhaust gas prior to entering the downstream exhaust component. The mixing duct configuration utilizes a deflector wall to define the flow guide path around a periphery of the mixer housing. The deflector wall forces the exhaust gas outwardly toward the outer housing wall and directs exhaust flow to change directions at least three times to form a full swirling motion. Further, the mixing duct configuration provides a long mixing length to ensure that the reducing agent is thoroughly mixed with the exhaust gas and evenly distributed across multiple SCR catalysts.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A mixer assembly for a vehicle exhaust component comprising:
   an outer housing having an inlet area that receives exhaust gas from an upstream exhaust component and an outlet area that directs exhaust gas to a downstream exhaust component, and wherein the outer housing is enclosed at a first end and has the inlet and outlet areas at a second end opposite the first end, and wherein the outer housing includes an outer wall extending between the first and second ends about a periphery of the outer housing; and
   a deflector wall to direct exhaust gas from the inlet area to the outlet area, the deflector wall having a portion spaced from the outer wall to define a flow guide path that first directs exhaust gas flow from the inlet area in a first direction against a first portion of the outer wall, then directs exhaust gas flow in a second direction against a second portion of the outer wall that is transverse to the first portion, and then directs exhaust gas flow to the outlet area.

2. The mixer assembly according to claim 1 wherein the deflector wall extends in a direction between the first and second ends and extends around the outlet area to form a U-shape.

3. The mixer assembly according to claim 1 wherein the outer housing includes a doser opening configured to receive an injector configured to inject a fluid, and wherein the flow guide path comprises a planar area to mix the exhaust gas and fluid, the doser opening defining a mounting angle to direct injected fluid into the planar area at an oblique angle relative to exhaust gas flow.

4. The mixer assembly according to claim 3 wherein the doser is configured to inject the fluid into the flow guide path between the deflector wall and the outer wall at a location immediately downstream of the inlet area such that a mixture of the fluid and exhaust gas are swirled within the planar area as the mixture is directed by the deflector wall along the flow guide path.

5. The mixer assembly according to claim 1 wherein the outer housing is defined by an overall length and an overall width that is less than the overall length, and wherein a path length of the flow guide path is defined as a summation of at least a first length the exhaust gas flows in the first direction, a second length the exhaust gas flows in the second direction, and a third length the exhaust gas flows in a third direction that is opposite the first direction, and wherein the path length is greater than the overall width of the housing.

6. The mixer assembly according to claim 1 wherein the deflector wall and outer wall cooperate to direct the exhaust gas flow in a third direction that is transverse to the second direction to create a swirling effect within a common planar area, and wherein exhaust gas enters the inlet area of the outer housing in an inlet direction that is generally perpendicular to the planar area and exits the outlet area in an outlet direction that is generally perpendicular to the planar area.

7. The mixer assembly according to claim 6 wherein the outlet direction is opposite the inlet direction.

8. The mixer assembly according to claim 1 wherein the outlet area defines an outlet axis, and wherein the deflector wall has a first end that is fixed to the outer wall and extends around the outlet area to terminate at a second end that is radially inward of the first end.

9. A mixer assembly for a vehicle exhaust component comprising:
   an outer housing having an inlet area that receives exhaust gas from an upstream exhaust component and an outlet area that directs exhaust gas to a downstream exhaust component, and wherein the outer housing includes an outer wall; and
   a deflector wall to direct exhaust gas from the inlet area to the outlet area, the deflector wall having a portion spaced from the outer wall to define a flow guide path that first directs exhaust gas flow from the inlet area in a first direction against a first portion of the outer wall and then directs exhaust gas flow in a second direction against a second portion of the outer wall that is transverse to the first portion, and wherein the portion of the deflector that is spaced from the outer wall comprises at least a first wall portion that extends in the first direction and transitions to a second wall portion that extends in the second direction, and further including a third wall portion that extends from the first wall portion in the second direction at an end opposite of the second wall portion.

10. The mixer assembly according to claim 9 wherein a distal end of the third wall portion extends to contact the outer wall.

11. The mixer assembly according to claim 9 wherein a distal end of the second wall portion curves inwardly toward a center of the outer housing.

12. The mixer assembly according to claim 9 wherein the outer wall includes a doser opening configured to receive an injector configured to inject a fluid.

13. A mixer assembly for a vehicle exhaust component comprising:
an outer housing having an inlet area that receives exhaust gas from an upstream exhaust component and an outlet area that directs exhaust gas to a downstream exhaust component, and wherein the outer housing is enclosed at a first end and has the inlet and outlet areas at a second end opposite the first end, and wherein the outer housing includes an outer wall extending between the first and second ends about a periphery of the outer housing; wherein the outer wall defines first and second sides that face each other and which are connected to each other by third and fourth sides that face each other, and wherein the first and second sides define an overall housing height and wherein the third and fourth sides define an overall housing width;
a deflector wall to direct exhaust gas from the inlet area to the outlet area, the deflector wall having a portion spaced from the outer wall to define a flow guide path to the outlet area, the flow guide path having a path length that is greater than the overall housing width, and
wherein the flow guide path first directs exhaust gas flow from the inlet area in a first direction against a first portion of the outer wall, then directs exhaust gas flow in a second direction against a second portion of the outer wall that is transverse to the first portion, and then directs exhaust gas flow to the outlet area.

14. The mixer assembly according to claim 13 wherein the outer housing includes a doser opening configured to receive a doser that injects a fluid into the flow guide path, and wherein a mixing length of the flow guide path is defined as a portion of the flow guide path that extends from the doser opening to the outlet area, and wherein the mixing length is greater than the overall housing width.

15. The mixer assembly according to claim 14 wherein the flow guide path comprises a planar area to mix the exhaust gas and the fluid, and wherein the doser is mounted at a mounting angle to direct injected fluid into the planar area at an oblique angle relative to exhaust gas flow.

16. The mixer assembly according to claim 13 wherein the flow guide path guides exhaust gas flow from the inlet area in the first direction along one of the first and second sides of the outer wall, and then directs exhaust gas flow in the second direction along one of the third and fourth sides of the outer wall, and then directs exhaust gas flow in a third direction along the other of the first and second sides of the outer wall to create a swirling effect within a common planar area, and wherein exhaust gas enters the inlet area of the outer housing in an inlet direction that is generally perpendicular to the planar area and exits the outlet area in an outlet direction that is generally perpendicular to the planar area.

17. The mixer assembly according to claim 13
wherein the overall housing width is less than the overall housing height,
wherein the outlet area defines an outlet axis, and wherein the deflector wall has a first end that is fixed to the outer wall and extends around the outlet area to terminate at a second end that is radially inward of the first end to define the flow guide path,
wherein the flow guide path at least first directs exhaust gas flow from the inlet area in the first direction and then directs exhaust gas flow in the second direction, and then directs exhaust gas flow along a third portion of the outer wall in a third direction that is opposite the first direction, and
wherein a path length of the flow guide path is defined as a summation of at least a first length the exhaust gas flows in the first direction, a second length the exhaust gas flows in the second direction, and a third length the exhaust gas flows in the third direction, and wherein the path length is greater than the overall housing width.

18. The mixer assembly according to claim 13 wherein the outer housing includes a connection interface configured for attachment to an exhaust component housing, and wherein the connection interface is at the second end of the outer housing.

19. The mixer assembly according to claim 13 wherein the outer wall includes a doser opening configured to receive an injector configured to inject a fluid.

20. A mixer assembly for a vehicle exhaust component comprising:
an outer housing having an inlet area that receives exhaust gas from an upstream exhaust component and an outlet area that directs exhaust gas to a downstream exhaust component, and wherein the outer housing includes an outer wall extending about a periphery of the outer housing;
wherein the outer wall defines first and second sides that face each other and which are connected to each other by third and fourth sides that face each other, and wherein the first and second sides define an overall housing height and wherein the third and fourth sides define an overall housing width;
a deflector wall to direct exhaust gas from the inlet area to the outlet area, the deflector wall having a portion spaced from the outer wall to define a flow guide path to the outlet area, the flow guide path having a path length that is greater than the overall housing width;
wherein the flow guide path guides exhaust gas flow from the inlet area in a first direction along one of the first and second sides of the outer wall, and then directs exhaust gas flow in a second direction along one of the third and fourth sides of the outer wall, and then directs exhaust gas flow in a third direction along the other of the first and second sides of the outer wall; and
wherein the portion of the deflector that is spaced from the outer wall comprises at least a first wall portion that is spaced from the one of the first and second sides and which extends in the first direction, and wherein the first wall portion transitions to a second wall portion that is spaced from the one of the third and fourth sides and which extends in the second direction, and further including a third wall portion that extends from the first wall portion in the second direction and is spaced apart from the second wall portion to form a U-shape.

21. The mixer assembly according to claim 20 wherein a distal end of the third wall portion extends to contact the outer wall.

22. The mixer assembly according to claim 21 wherein a distal end of the second wall portion curves inwardly toward a center of the outer housing.

23. The mixer assembly according to claim 21 wherein a distal end of the second wall portion extends toward the third wall portion.

24. The mixer assembly according to claim 20 wherein the outer wall includes a doser opening configured to receive an injector configured to inject a fluid.

* * * * *

UNITED STATES PATENT AND TRADEMARK OFFICE
CERTIFICATE OF CORRECTION

PATENT NO. : 10,337,379 B2
APPLICATION NO. : 15/030388
DATED : July 2, 2019
INVENTOR(S) : Dimpelfeld et al.

Page 1 of 1

It is certified that error appears in the above-identified patent and that said Letters Patent is hereby corrected as shown below:

In the Claims

In Claim 4, Column 6, Line 6-7; replace "the doser" with --the injector--

In Claim 5, Column 6, Line 22; replace "the housing" with --the outer housing--

In Claim 6, Column 6, Line 30; replace "the planar area" with --the common planar area--

In Claim 6, Column 6, Line 31; replace "the planar area" with --the common planar area--

In Claim 8, Column 6, Line 37; replace "the second end that" with --the second end of the deflector wall that--

In Claim 8, Column 6, Line 38; replace "the first end." with --the first end of the deflector wall.--

In Claim 9, Column 6, Line 55; replace "the deflector that" with --the deflector wall that--

In Claim 16, Column 7, Line 54; replace "the planar area" with --the common planar area--

In Claim 16, Column 7, Line 55; replace "the planar area" with --the common planar area--

In Claim 17, Column 7, Line 62; replace "a second end that" with --a second end of the deflector wall that--

In Claim 17, Column 7, Line 62; replace "the first end to" with --the first end of the deflector wall to--

In Claim 20, Column 8, Line 44; replace "the deflector that is spaced" with --the deflector wall that is spaced--

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*